US009179401B2

(12) United States Patent
Yerrabommanahalli et al.

(10) Patent No.: US 9,179,401 B2
(45) Date of Patent: Nov. 3, 2015

(54) METHODS AND APPARATUS FOR DYNAMICALLY CONFIGURING SEARCH OPERATIONS IN A MULTI-MODE DEVICE

(71) Applicant: Apple Inc., Cupertino, CA (US)

(72) Inventors: Vikram B. Yerrabommanahalli, Sunnyvale, CA (US); Prashant H. Vashi, Cupertino, CA (US); Madhusudan Chaudhary, Cupertino, CA (US); Brian H. Cassidy, Cupertino, CA (US); Karthik Anantharaman, Sunnyvale, CA (US); Bharath Narasimha Rao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 13/829,279

(22) Filed: Mar. 14, 2013

(65) Prior Publication Data

US 2013/0244723 A1    Sep. 19, 2013

Related U.S. Application Data

(60) Provisional application No. 61/610,715, filed on Mar. 14, 2012.

(51) Int. Cl.
*H04M 1/00* (2006.01)
*H04W 48/18* (2009.01)
*H04W 48/16* (2009.01)

(52) U.S. Cl.
CPC .............. *H04W 48/18* (2013.01); *H04W 48/16* (2013.01); *Y02B 60/50* (2013.01)

(58) Field of Classification Search
CPC .............................. H04W 48/18; H04W 80/04
USPC ......... 370/331, 466, 311, 312, 203, 355, 310, 370/338; 455/438, 436, 567, 406, 434, 524, 455/411, 552.1
See application file for complete search history.

(56) References Cited

U.S. PATENT DOCUMENTS

2004/0266436 A1* 12/2004 Jaakkola et al. .............. 455/436
2011/0019640 A1*  1/2011 Chang et al. .................. 370/331
2012/0309391 A1* 12/2012 Zhang et al. ............... 455/432.1

* cited by examiner

*Primary Examiner* — Kiet Doan
(74) *Attorney, Agent, or Firm* — Downey Brand LLP

(57) ABSTRACT

Methods and apparatus for dynamic search management in a multi-mode device. In one embodiment, a mobile device performs network search and acquisition by dynamically changing search delays and/or search frequencies. In one implementation, the mobile device adjusts the amount of time allocated for each network search based on e.g., previous network connection history (e.g., previously connected to a home network, previously connected to a roaming network), device conditions, user preferences, geographical information, etc. By focusing search effort on cellular technologies which have a high likelihood of success, the mobile device can greatly improve search time and reduce unnecessary power consumption.

17 Claims, 5 Drawing Sheets

METHODS AND APPARATUS FOR DYNAMICALLY CONFIGURING SEARCH OPERATIONS IN A MULTI-MODE DEVICE

PRIORITY

This application claims priority to co-owned and U.S. Provisional Application Ser. No. 61/610,715 and entitled "METHODS AND APPARATUS FOR DYNAMICALLY CONFIGURING SEARCH OPERATIONS IN A MULTI-MODE DEVICE", filed Mar. 14, 2012, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless communication. More particularly, in one exemplary aspect, the disclosure is directed to methods and apparatus for dynamically configuring search operations in a multi-mode device.

2. Description of Related Technology

Mobile wireless devices are becoming increasingly full-featured and complex, and accordingly must support multiple aspects of operation, including for example voice calls, data streaming, and various multimedia applications. Multi-network (also referred to as the multi-mode) wireless devices are often used to provide connectivity in mobile applications where uses may change their location (e.g., while traveling).

During so-called "roaming" access, a multi-mode device may attempt to switch between each of its available modes (networks), so as to identify a suitable cellular network for operation. For example, consider a multi-mode device having three modes: (i) CDMA2000 which is associated with the multi-mode device's home network, (ii) GSM, and (iii) WCDMA. During operation, the device will power up and attempts to scan for a CDMA2000 network (such as based on a Preferred Roaming List or PRL). CDMA2000 searches are based on detection of a so-called "pilot" signal. If the mobile device can identify the presence of the pilot signal, the mobile will proceed to acquire timing and phase alignment. Once the mobile device has aligned to the base station, it can synchronize fine timing, receive control information, and register to the network.

If no CDMA2000 networks are located, the device attempts to scan for any GSM networks, such as based on a Subscriber Identity Module (SIM) preference. During the GSM search, the mobile device searches for a beacon signal within the standard GSM frequency bands. If the beacon signal is found, then the device determines the timing by searching for a synchronization channel, which is transmitted according to a fixed schedule. If no GSM network is located, the device attempts to scan for any WCDMA networks based on a SIM preference. Once the mobile device has completed Primary Synchronization Sequence (PSS) and Secondary Synchronization Sequence (SSS) searches, the mobile device can decode the BCCH, and decode control information necessary to initiate network registration.

If no WCDMA network has been found, then the device repeats the foregoing process. This repeating or looping process is "fixed", and does not change regardless of the mobile device's previous connection history. Furthermore, this process can waste a significant amount of power on modes which have less likelihood of success.

Accordingly, improved schemes for multi-mode device network searching are needed. Ideally, such schemes should reduce overall power consumption by intelligently allocating search time for each network technology, rather than looping through each available option until a wireless network is found.

SUMMARY

The aforementioned needs are satisfied by the present disclosure which provides, inter alia, apparatus and methods for dynamically configuring search operations in a multi-mode device.

Firstly, a method for dynamically configuring search operations in a multi-mode device is disclosed. In one embodiment, the method includes identifying information relating to a previous network connection history; determining a search behavior based on the previous network connection history; and executing the search behavior. In one variant, the search behavior comprises a single-mode network search for a time interval.

An apparatus adapted to dynamically configure search operations in a multi-mode device is also disclosed. In one embodiment, the apparatus includes one or more modems; a processor; and a non-transitory computer readable apparatus having a storage medium with a computer program stored thereon. In one variant, the computer program is configured to, when executed on the processor, identify information relating to a previous network connection history; determine a search behavior based on the previous network connection history, and execute the search behavior. The search behavior may include for example a single-mode network search for a time interval.

A system for capabilities management within heterogeneous networks is further disclosed.

A network entity configured for use with a client-based capabilities management scheme within heterogeneous networks is also disclosed.

A non-transitory computer readable apparatus is further disclosed. In one embodiment, the apparatus includes at least one computer program stored on a medium, the at least one program configured to, when executed, implement a capabilities management process within one or more wireless networks.

Other features and advantages will immediately be recognized by persons of ordinary skill in the art with reference to the attached drawings and detailed description of exemplary embodiments as given below.

Figure 1:
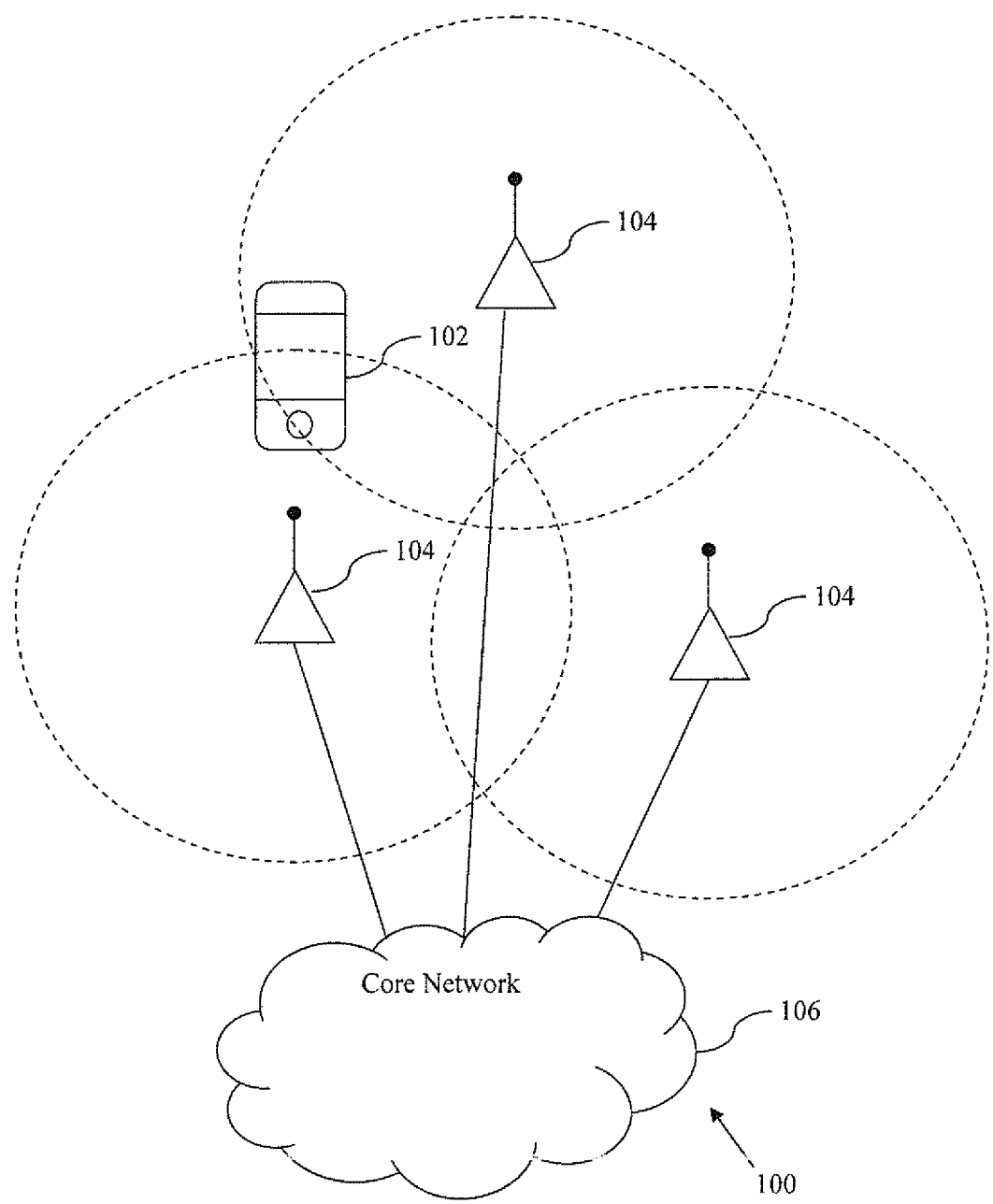
FIG. 1 is a graphical representation of one exemplary cellular network useful in illustrating various aspects of the present disclosure.

All FIGS.© Copyright 2013 Apple Inc. All rights reserved.

DETAILED DESCRIPTION

Reference is now made to the drawings, wherein like numerals refer to like parts throughout.

Overview—

Multi-mode cellular devices may be used with different cellular technologies. During so-called "roaming" access, a multi-mode device will switch between each of its available modes, so as to identify a suitable cellular network for operation. Various cellular technologies tend to have different deployment densities in different geographic locations. For example, within the United States, CDMA-based technologies such as e.g., CDMA2000 1X, CDMA2000 EV-DO Rev. 0, and CDMA2000 EV-DO Rev. A are very popular, whereas within Europe and Asia, GSM, GPRS, EDGE, and UMTS are common.

Existing multi-mode cellular devices loop through each of the modes during network searches, which consume a significant amount of power. However, existing approaches do not account for the geographic likelihood of finding and registering to a cellular technology that may be similar to one or more previously active cellular technologies. More succinctly, where a user has powered off or lost reception in an area serviced by a Mobile Network Operator (MNO) offering a first cellular technology, the user may be much more likely to locate and register to a network in the area with the same cellular technology (where the MNO can be either the same or, in some cases different) as opposed to a network with a dissimilar cellular technology.

Consequently, improved methods and apparatus for network search and acquisition are disclosed herein. The performance of the search and acquisition process is greatly improved in one exemplary embodiment of the disclosure by dynamically changing search delays and/or search frequencies. Specifically, in one variant, a device will adjust the amount of time allocated for each network search based on e.g., previous network connection history (e.g., previously connected to a home network, previously connected to a roaming network), device conditions, user preferences, and/or geographical information. By focusing on the highest probability modes, the multi-mode device can both greatly improve search time and reduce unnecessary power consumption.

Various implementations are disclosed hereinafter. In one such implementation, a configurable timer is used to control the amount of time spent on each mode. In other variants, an incrementing (or decrementing) counter is used to control the number of scans performed by each mode. Moreover, by adjusting the amount of time or scans spent within each mode, a looping procedure can further adjust the relative search frequency. For example, in one implementation, the loop includes a first interval spent on a first cellular mode, a second interval spent on a second cellular mode, etc. By repeating this cycle, the amount of time spent in searching in each mode can be divided according to likelihood of success.

Various implementations may further configure timers and/or counters based at least in part on use scenario. For example, certain configurable timers and/or timers may be adjusted to improve e.g., initial search, device power up, or subsequent searches after system loss, etc.

A multi-mode device is also disclosed that is capable of (i) CDMA2000, (ii) GSM, and (iii) WCDMA operation. As described in greater detail herein, the multi-mode device is configured to scan for networks in single-mode search (i.e., searching for a single technology) for a set amount of time. If the device fails to locate a network in single-mode search within the allotted time, then the device transitions to a multi-mode search.

Description of Exemplary Embodiments

Exemplary embodiments of the present disclosure are now described in detail. While these embodiments are primarily discussed in the context of cellular networks including without limitation, third generation (3G) CDMA2000, Global System for Mobile communications (GSM), and Universal Mobile Telecommunications Systems (UMTS) cellular networks, it will be recognized by those of ordinary skill that the present disclosure is not so limited. In fact, the various features of the disclosure are useful in and readily adapted to other cellular technologies including for example: General Radio Packet Service (GPRS), Enhanced Data Rates for GSM Evolution (EDGE), Long Term Evolution (LTE), LTE-Advanced (LTE-A), Interim Standard 95 (IS-95), Interim Standard 2000 (IS-2000, also referred to as CDMA2000), CDMA 1XEV-DO, Time Division Single Carrier CDMA (TD-SCDMA), Time Division LTE (TD LTE), etc.

Moreover various aspects of the present disclosure are not limited to cellular technologies. It will be recognized by artisans of ordinary skill that the present disclosure is applicable to multiple areas of wireless technologies including for example, Wireless Local Area Networks (WLAN), Personal Area Networks (PAN), and Metropolitan Area Networks (MAN). Common commercial examples of the foregoing include, without limitation, Wi-Fi, WiMAX, Bluetooth, etc.

It will be appreciated that a "cross-category" search or scan can be implemented consistent with the disclosure, such as where for example a data "call" must be made, the device can scan first for a cellular technology capable of handling the call (such as e.g., LTE), and where a suitable cellular solution is not found, scanning other solutions such as WLAN and/or WMAN.

Cellular Networks—

In the following discussion, an exemplary cellular radio system is described that includes a network of radio cells each served by a transmitting station, known as a cell site or base station (BS). The radio network provides wireless communications service for a plurality of mobile station (MS) devices. The network of BSs working in collaboration allows for wireless service which is greater than the radio coverage provided by a single serving BS. The individual BSs are connected to a Core Network, which includes additional controllers for resource management and is in some cases capable of accessing other network systems (such as the Internet, other cellular networks, etc.).

FIG. 1 illustrates one exemplary cellular network 100, with client devices 102, operating within the coverage of the Radio Access Network (RAN) provided by a number of base stations (BSs) 104. The Radio Access Network (RAN) is the collective body of base stations and associated network entities that are controlled by a Mobile Network Operator (MNO). The user interfaces to the RAN via the client devices, which in many typical usage cases is a cellular phone or smartphone. However, as used herein, the terms "mobile station", "mobile device", "client device", "user equipment", and "user device" may include, but are not limited to, cellular telephones, smart phones (such as for example an iPhone™ manufactured by the Assignee hereof), personal computers (PCs) and minicomputers, whether desktop, laptop, or otherwise, as well as mobile devices such as handheld computers, PDAs, personal media devices (PMDs), tablet computers such as the exemplary iPad™ device manufactured by the Assignee hereof, or any combinations of the foregoing.

As shown in FIG. 1, the RAN is coupled to the Core Network 106 of the MNO e.g., via broadband access. The Core Network provides both routing and service capabilities. For example, a first client device connected to a first base station can communicate with a second client device connected to a second base station, via routing through the Core Network. Similarly, a client device can access other types of services e.g., the Internet, via the Core Network. The Core Network performs a wide variety of functions, including without limitation, authentication of client devices, authorization of client devices for various services, billing client devices for provisioned services, call routing, etc.

As a brief aside, cellular networks are owned and operated by a Mobile Network Operator (MNO). Typically, a client device is used in a so-called "home network"; the client's home network is operated by the MNO and has the information necessary to authenticate and provision service to the client device (e.g., cryptographic keys used for authentication, service agreements, billing information, etc.). However, the client device may "roam" outside of the home network; accordingly, so-called "roaming" access refers to the set of services that are provided by a "visited network" with which the client device is not associated. Visited networks are typically operated by a different MNO than the MNO that a mobile device is associated with, however this is not always true (i.e., due to business arrangements, legal regulation, etc.). Roaming services are negotiated between MNOs to provide reciprocal service agreements to improve service coverage for their subscriber populations, respectively. For example, MNOs typically negotiate roaming relationships with other MNOs in different countries to enable accessibility of voice, data and other supplementary services for their subscribers when they travel internationally.

Existing networks (and client devices) have a wide range in both technological capabilities and business models. For example, a 3GPP2 operator (3GPP2 technologies include e.g., CDMA2000 1X, CDMA2000 EV-DO Rev. 0, CDMA2000 EV-DO Rev. A, and CDMA2000 EV-DO Rev. B, etc.) can have roaming relationships with other 3GPP2 operators and/or 3GPP operators (3GPP technologies include e.g., GSM, GPRS, EDGE, UMTS, LTE etc.). These so-called "cross technology agreements" can be useful with devices that support multiple technologies (also referred to as "multi-mode" devices). However, it should be noted that a client device having multi-mode capability doesn't automatically warrant service (a roaming agreement between the operators is required).

As used hereinafter, the term "heterogeneous networks" and/or "hybrid networks" may refer generally and without limitation to networks which have substantially different capabilities and/or ownership. While the described the population of cellular networks (e.g., which have different technologies, and are operated by different Mobile Network Operators (MNOs)) is an illustrative heterogeneous network, it is further appreciated that heterogeneous networks are widely used in other wireless technologies including for example, wireless local area networking (WLAN), personal area networking (PAN), etc. For example, commercially successful examples of heterogeneous networks include without limitation Wi-Fi, Wireless Microwave Access (WiMAX), etc.

Moreover, as used herein, the term "home network" refers generally and without limitation to a cellular network which a mobile device is associated with (e.g., according to various business arrangements between the mobile device subscriber and the Mobile Network Operator of the home network). In contrast, the terms "visited network", or "roaming network" refer to a cellular network which a mobile device is not associated with. During roaming access, the mobile device must identify the visited network, and the visited network provisions service to the mobile device based on terms agreed between the MNO of the visited network and the MNO of the home network.

Roaming Procedures—

Figure 2:
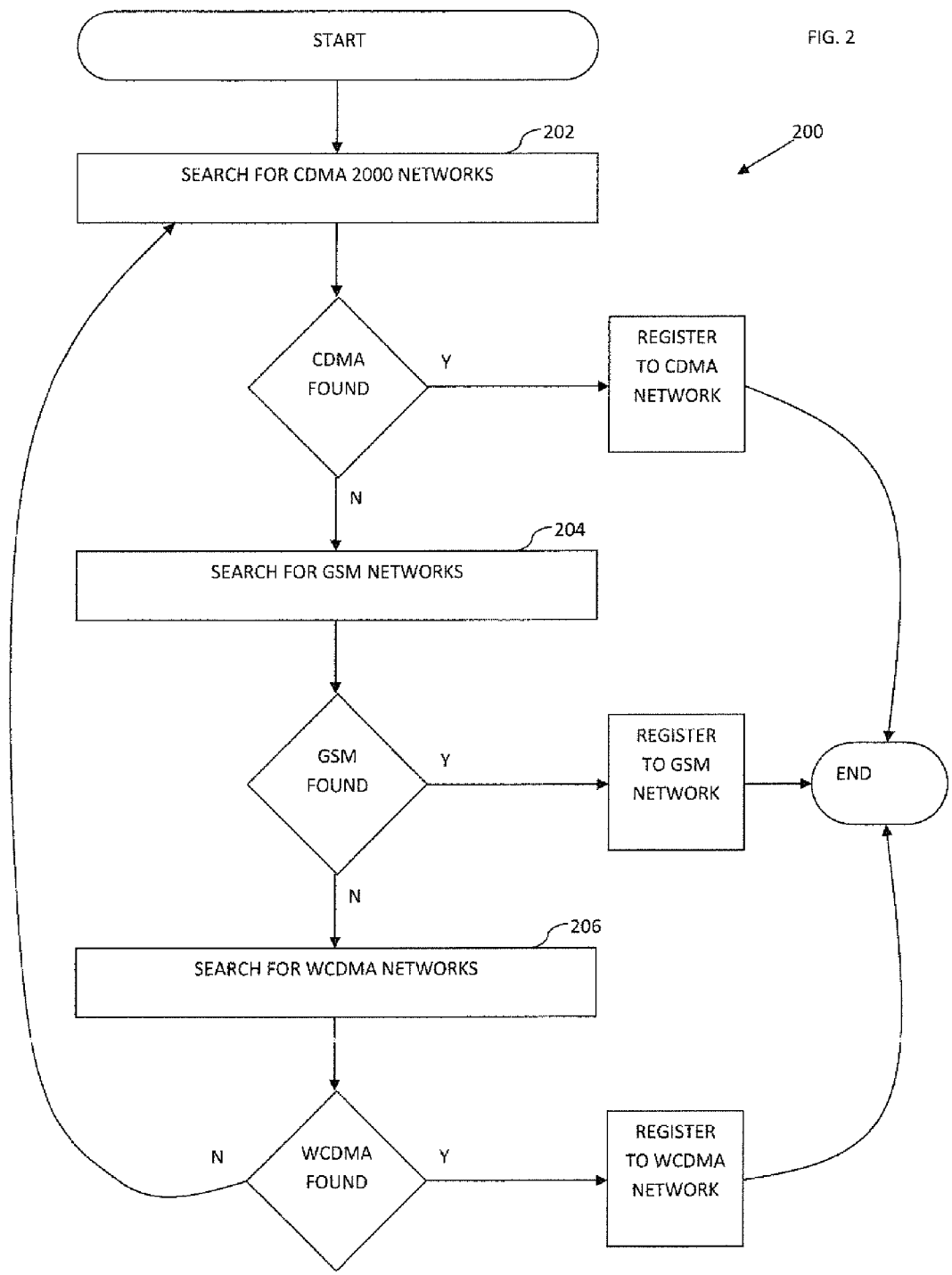
FIG. 2 is a logical flow diagram representing one typical prior art search scheme for use with a multi-mode roaming device.

Referring now to FIG. 2, one prior art roaming scheme is illustrated for a multi-mode device having three modes: (i) CDMA2000 which is associated with the multi-mode device's home network, (ii) GSM, and (iii) WCDMA.

As previously discussed, the mobile device first powers up and attempts to scan for a CDMA2000 network based on a Preferred Roaming List (PRL) (step 202 of the method 200 of FIG. 2). CDMA2000 searches are based on detection of a so-called "pilot" signal. The pilot signal is a repeating sequence which is broadcast by each CDMA2000 base station. If the mobile device can identify the presence of the pilot signal, the mobile will proceed to acquire timing and phase alignment. Once the mobile device has aligned to the base station, it can synchronize fine timing, receive control information, and register to the network.

If no CDMA2000 networks are located then at step 204, the device attempts to scan for any GSM networks based on a Subscriber Identity Module (SIM) preference. During the GSM search, the mobile device searches for a beacon signal within the standard GSM frequency bands. If the beacon signal is found, then the device determines the timing by searching for a synchronization channel, which is transmitted according to a fixed schedule. Once the device has synchronized to the GSM network, the device can decode a Broadcast Control Channel (BCCH), which provides control information necessary to initiate network registration.

If no GSM network is located, then at step 206, the device attempts to scan for any WCDMA networks based on a SIM preference. During WCDMA searches, the mobile device performs searches for a Primary Synchronization Sequence (PSS). Once the mobile device has located the PSS, the mobile device can identify the frame timing and limited base station information from a Secondary Synchronization Sequence (SSS). Once the mobile device has completed the PSS and SSS searches, the mobile device can decode the BCCH, and decode control information necessary to initiate network registration.

If no WCDMA network has been found, then the device returns to step 202, and repeats the process 200.

As illustrated in the search scheme of FIG. 2, existing mobile devices loop through network searches until a network is found. This process is disadvantageously "fixed", and does not change regardless of the mobile device's previous connection history. Also, as previously noted, this process can waste a significant amount of power on modes which have a low likelihood of success.

Methods—

Improved schemes for multi-mode device network searching are now described in greater detail. Such schemes can, inter alia, reduce overall power consumption by intelligently allocating search time for each network technology, rather than looping through each available option until a wireless network is found.

As previously stated, network technologies are not uniformly distributed. For example, within the United States, CDMA2000 and GSM technologies are very popular, whereas within Europe and Asia, GSM, GPRS, EDGE, UMTS are common. However, a multimode device that has a CDMA2000 home network should prefer CDMA2000 networks (even where GSM/UMTS systems are available). For instance, if roaming agreements are not in place between the home network and the visited network, the multimode device cannot camp or use any service (except emergency calls) while on the GSM/UMTS system. Thus, the multimode device should ideally allocate search time based on the likelihood of success for registration and access to services provided by a network.

In view of the relative difference in technology deployment densities, schemes for network search and acquisition can be greatly improved by dynamically changing one or more variables such as search delays and/or search periodicity. Specifically, in one exemplary embodiment of the present disclosure, a device will adjust the amount of time allocated for each network search based on e.g., previous network connection history (e.g., previously connected to a home network, previously connected to a roaming network), device conditions, user preferences, geographical information, etc. By intelligently managing network searches, the mobile device can reduce the amount of time spent searching for networks which are unlikely to yield a positive result.

The following discussion provides generalized methods for dynamically configuring search operations in a multi-mode device. In one implementation, the method optimizes power consumption (e.g., battery usage) by operating the multi-mode device as a single-mode device for a time period based on a configurable timer. In one such variant, the configurable timer is based on identification of the network (e.g. home network or roaming network). Moreover, while the foregoing discussion is based on a timer and/or counter, it is appreciated that similar results may be achieved by e.g., changing the relative search frequency. For example, a mobile device can perform a single-mode search according to a first interval, and then switch over to multi-mode search for a second interval. By looping between single-mode and multi-mode searches, the mobile device has fine control over the frequency of single-mode versus multi-mode search.

Additionally, while various schemes are described hereinafter with respect to a multi-mode device having (i) CDMA2000, (ii) GSM, and (iii) WCDMA, the foregoing combination is merely illustrative. Multi-mode devices are highly diverse; dual-mode, tri-mode, and quad-mode devices of various configurations are widely available with multiple different cellular technologies.

Figure 3:
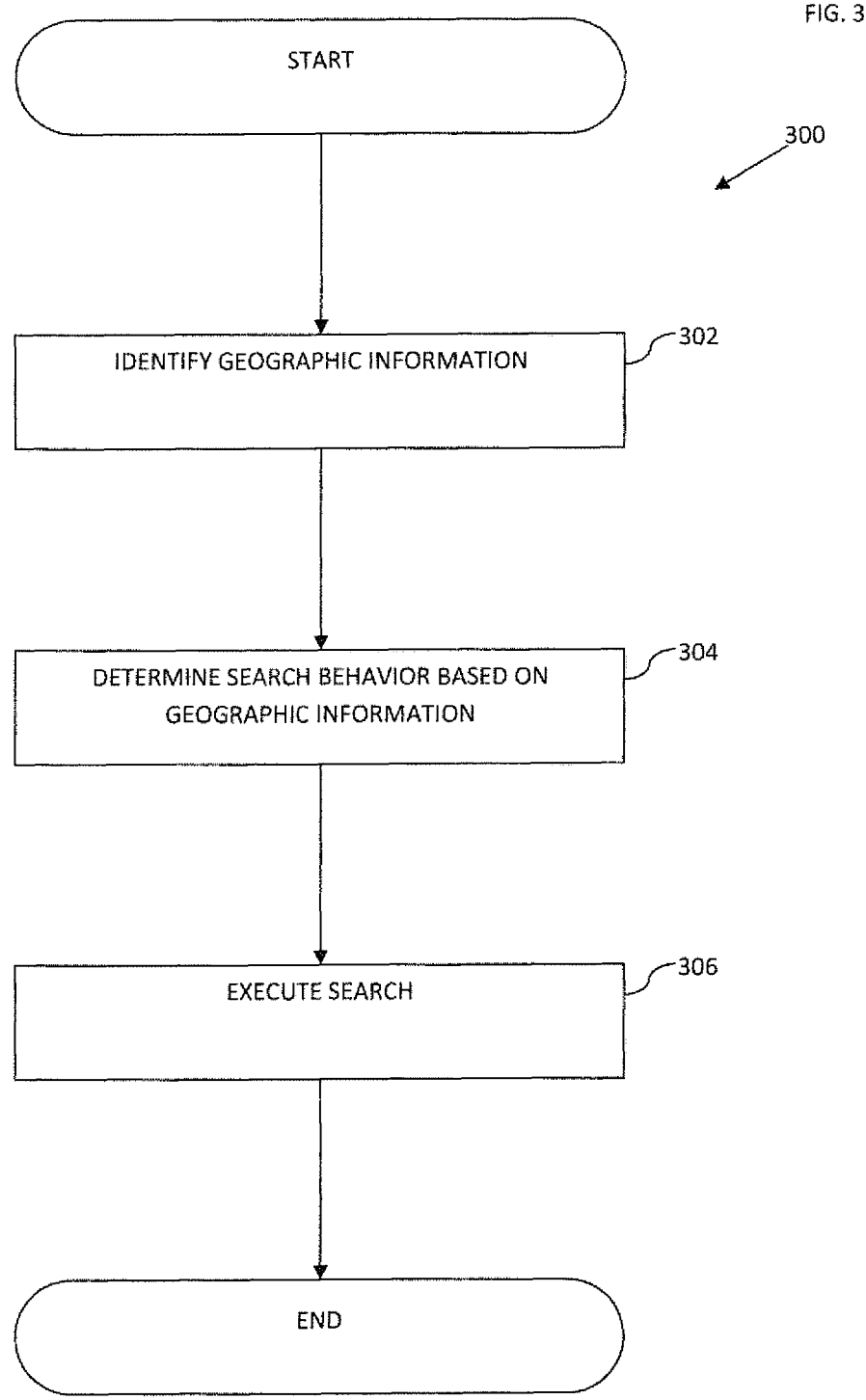
FIG. 3 is a logical flow diagram representing a generalized method for dynamically configuring search operations in a multi-mode device, in accordance with one feature of the present disclosure.

Referring now to FIG. 3, one logical flow diagram of a generalized method for dynamically configuring search operations in a multi-mode device in accordance with the present disclosure is illustrated.

At step 302 of the method 300, the mobile device identifies geographic information. In one embodiment, the geographic information includes information relating to previously established network connections. For example, the mobile device may determine if its previous network connection was its home network or a visited network; i.e., the device determines if was previously roaming. If the previous network was its home network, then the device assumes that it is still in its home network. In contrast, if the mobile device was previously roaming, then the client device will assume that it remains in a roaming area.

In other embodiments, the geographic information may include for example, information received in out-of-band communication. Common examples of such information include, without limitation: (i) geographic information provided from other interfaces (e.g., Wi-Fi beacons, Global Positioning System (GPS) coordinates, via a WLAN or other air interface on the device, etc.), (ii) user input, (iii) historical information based on previous usage, etc.

It will also be appreciated that the terms "previous" and "previous network connection" may encompass any number of different schemes, including without limitation: (i) the last connection established by the device; (ii) the last connection established that lasted for a prescribed period of time, which transferred a prescribed amount of data, or which meets some other metric such as signal strength, "number of bars", etc.; (iii) a statistical or other sampling of a number of prior connections (e.g., the most frequently used connection out of the prior m connections) for that device and/or other devices within the same or other networks; etc.

At step 304 of the method 300, the mobile device determines a search behavior based on the identified geographic information. For example, in one exemplary embodiment, if the mobile device has determined that the device was previously operating in the home network, then the mobile device may set a first search behavior, whereas if the mobile device was previously roaming, then the mobile device may set a second search behavior.

In one such variant, if the mobile device was previously connected to its home network, then the device will assume that it is still in its home network. The mobile device will set a timer, to favor searching the home network technology. For example, the mobile device will operate as a single-mode device until a home_timer expires. During single-mode operation, the mobile device will use its default home technology mode to perform a search for a network. Consider an exemplary multi-mode device with interfaces configured for: (i) CDMA2000 which is associated with its home network, (ii) GSM, and (iii) WCDMA. If the mobile device was previously used within its home network, than the mobile device will default to CDMA2000 scans.

Once the home_timer expires, the mobile device will transition to multi-mode operation to perform a search for other networks. In one embodiment, the home_timer is a pre-defined timer. Alternately, the home_timer may be a dynamically configurable timer. In one such variant, the configuration of the timer may be based on one or more device considerations including for example: power consumption and/or remaining power (e.g., remaining battery charge, such as where the single mode operation persists longer at lower remaining battery levels, so as to conserve power), performance requirements, user-configured settings, historical data (e.g., an average or highest value of the connection time for the last n connection events), etc.

Referring back to the exemplary multi-mode device, once the home_timer has expired, the device switches to multi-mode scanning (e.g., scanning GSM and then WCDMA networks).

In still other variants, the home_counter may be an incrementing (or decrementing count) of a pre-defined or configurable number of single-mode scans to locate a network before switching over to multi-mode scanning operation.

Similarly, in one such variant, if the mobile device was previously connected to a roaming network, then the device will assume that it is still in the roaming network. The mobile device will set a timer, to favor searching the previously used roaming network technology. Thus, during roaming operation, the mobile device operates as a single-mode device until the roam_timer expires using the selected roaming technology. The roaming technology may be the last technology used by the mobile device, or alternately, the roaming technology may be selected on the basis of deployment density. In other words, rather than using the last used technology (which may be advanced or esoteric), the roaming technology may be selected on the basis of its worldwide deployment density. In still other embodiments, a roam_counter may be based on an incrementing (or decrementing) count of a pre-defined or configurable number of scans to locate a network before switching over to multi-mode scanning operation.

In some implementations, the roam_timer or roam_counter is configured to the trivial value of zero (0). Trivial-valued embodiments will operate immediately as a multi-mode device.

For example, consider a subscriber that travels to a single destination serviced by a visited network (such as a long vacation). If the multi-mode device is configured for single-mode operation with the previously used roaming technology, then each time the subscriber powers on their device in the visited network, the device can quickly search for and acquire the visited network. In contrast, consider a subscriber that travels to multiple destinations serviced by different visited networks. In this scenario, remaining in single-mode operation is not necessarily beneficial; thus, the multi-mode device is configured with a trivial value of zero for the roam_timer (i.e., immediately change to multi-mode searching). Alternately, the multi-mode device may set itself for single-mode operation with a very widely used cellular technology (e.g., GSM).

In still other embodiments, the roam_timer or roam_counter can be set to a single scan in single-mode before switching to multi-mode use.

In alternate embodiments, where the mobile device is definitively "known" (e.g., based on user input, GPS coordinates, etc.) to be in a home network or roaming network, the mobile device may change its behavior according to the determined information.

At step 306 of the method 300, the mobile device searches for a network based on the determined search behavior. In one embodiment, if the search is unsuccessful, the device repeats the same searching procedure, such as for a finite or specified number of repeat "tries", after which a different strategy is employed. In alternate embodiments, if the search strategy is unsuccessful, the device adjusts the strategy. For example, in one exemplary embodiment, if the device cannot find a network, the device may adjust a timer length (or counter) for single-mode searching and/or multi-mode searching.

In still other implementations, if the search strategy is unsuccessful, the device may reassess or request more information. For example, the mobile device may query the user or another network entity for additional information.

It will also be appreciated that the search may be unsuccessful due to physical factors (such as: the device being located in a signal fade area, the antenna being somehow obstructed, the device having insufficient remaining power to establish the connection, etc.). The exemplary mobile device may be programmed for such cases, e.g., to prompt the user to take an action to alleviate the disability (e.g., an on-screen or audible message such as "move to a higher signal strength location before attempting this call", or "recharge the battery"), and the foregoing search/scan logic suspended temporarily if desired until the appropriate action is taken.

Where a search is successful, the device attempts to register to the found network and resets its associated timers and/or counters. Thus, even where the device is unable to register to the found network, the device can search again in accordance with the present disclosure. Alternately, the timers and/or counters may be "paused", or in some cases, kept "running".

Example Operation—

Figure 4:
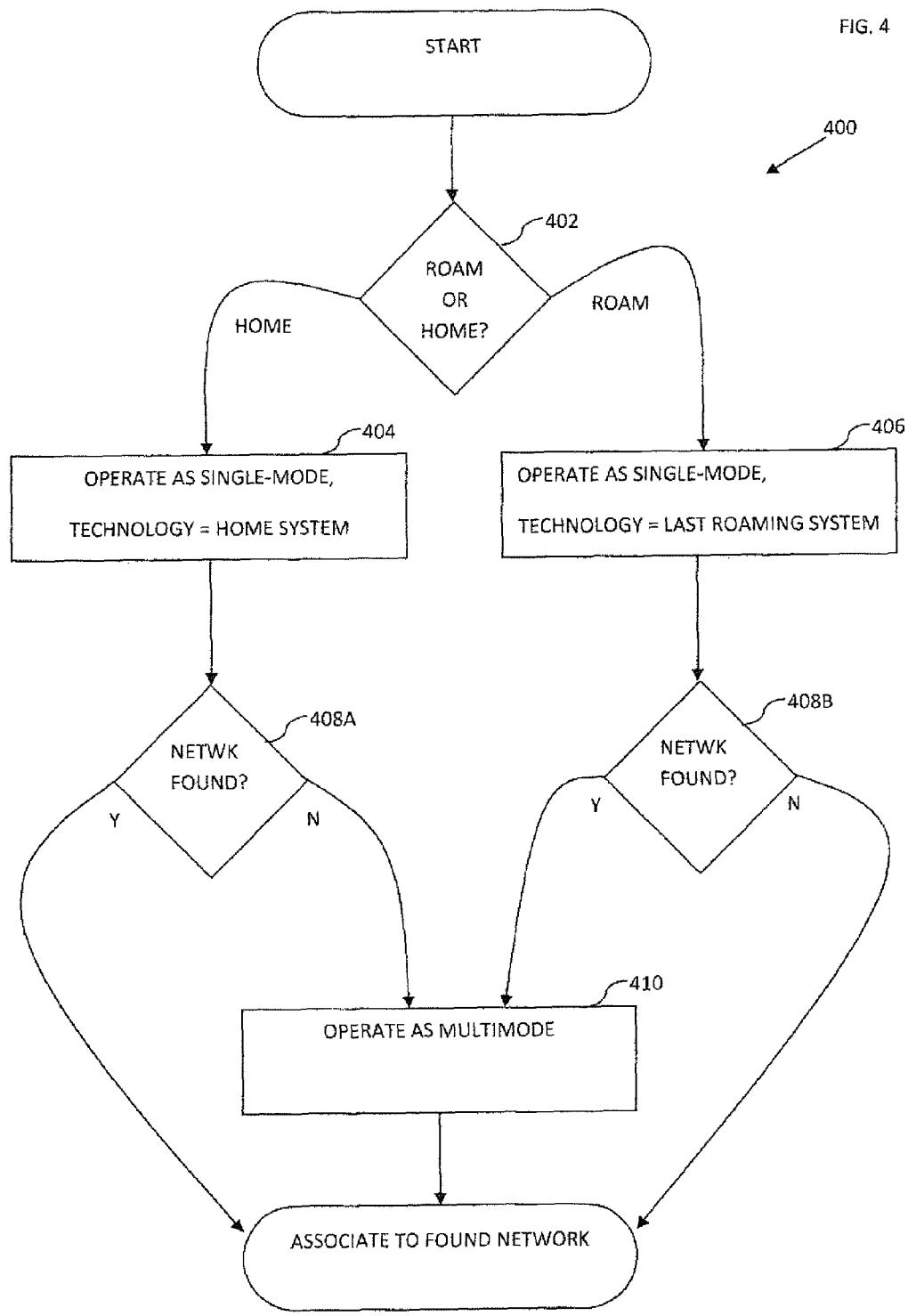
FIG. 4 is a logical flow diagram representing one exemplary method for power optimization of a mobile device by delaying multi-mode scanning, in accordance with various features of the present disclosure.

Referring now to FIG. 4, one exemplary method 400 for power optimization of a mobile device by delaying multi-mode scanning is shown. In this example, the mobile device is a multi-mode device having three modes: (i) CDMA2000, (ii) GSM, and (iii) WCDMA. The multi-mode device bases its search strategy on its previous connection history. For example, if the mobile device loses network reception of a CDMA2000 system, the device performs single-mode scans for CDMA2000 systems based on the complete Preferred Roaming List (PRL). If no CDMA2000 systems are found, then the device switches to multi-mode operation and executes GSM and WCDMA scans as defined by the subscriber identification module (SIM) profile.

By limiting the mobile device's initial searches to single-mode operation based on its previous search history, the device can greatly improve its overall power consumption. Specifically, the mobile device focusing its search resources on cellular technologies which have a much higher likelihood of success (e.g., if the device was previously connected to a CDMA2000 network, it is much more likely to find and register to another (or the same) CDMA2000 network). Since a device has a very high likelihood of reconnecting to the lost network technology, the overall probability of success for the search is very high compared to existing schemes. For example, the mobile device which was previously connected to CDMA2000 networks will only scan for CDMA2000 networks for a brief period of time; once the timer has expired, the device will fallback to multi-mode operation and check for nearby GSM/WCDMA networks.

At step 402 of method 400, the mobile device determines if it was previously operating in a home access state or a roaming access state. The distinction between home access and roaming access is an optimization to improve selection between distinct timers or counters. For example, a CDMA2000 device that has a home network which is based in the United States (US) and which was last connected to its home network is much more likely to find and register to a CDMA2000 network. More importantly, the device should prefer its home MNO (as it is more cost effective) thus the device's home_timer is set to a relatively long scan interval (e.g., 10 minutes). Similarly, a GSM device that has a home network in the US and was most recently connected to its home network, should also preferentially select a GSM network. In contrast, if that same device was previously operating in Asia, the device should continue to assume that it is still in Asia; consequently, the device can remain in a single-mode scan for roam_timer for GSM/WCDMA installations.

In simplified embodiments where there is no distinction between home and roaming timers, the device can skip the step of determining the previous operational state of the mobile device. In other words, the device may have a simple timer for single-mode operation; in one such variant, the technology used during single-mode searching is the previously used technology (for example, if the device was previously connected to a CDMA2000 network, the single-mode search is set to CDMA2000).

Referring back to FIG. 4, if the device was previously operating within a home network, then the logic flows to step 404. For the duration of a home_timer (or home_counter), a mobile device will only perform scans of the home technology; i.e., act as a single-mode device, until the home_timer expires. The exemplary logic will then flow to step 408.

If the device was previously operating within a visited network (roaming), then the logic of FIG. 4 flows to step 406. For the duration of a roam_timer (or roam_counter), a mobile device will only perform scans of the last used roaming technology; i.e., act as a single-mode device, until the roam_timer expires. The roam_timer can be set for a shorter duration than the home_timer of step 404, and even in certain circumstances be set to zero (0) to have the device immediately, without delay, enter multi-mode operation. This can be useful to, inter alia, find whatever technologies are available during travel (presumably roaming access is typically encountered during travel).

In an embodiment of the present disclosure, the home_timer and roam_timer can be flexibly configured based on various conditions. Common examples of considered conditions include without limitation power consumption, remaining battery life, previous states of the device, previous results of prior scans, geographic location, user input, out-of-band information (e.g., discovery information), etc.

Finally, the device determines whether the timer has expired without finding a suitable network when operating in single-mode (steps 408A, 408B). If the mobile device has found a suitable network, the method 400 completes, and the mobile device associates with the found network. If the mobile device did not find a suitable network, logic flows to step 410.

At step 410, the mobile device operates as a multi-mode device. Scanning in multi-mode may be weighted or otherwise disproportionately distributed across technologies, or be equal across technologies. For example, the mobile device, after scanning for CDMA2000 networks in single mode, may scan for GSM or WCDMA networks in multi-mode. The mobile device may scan for GSM technologies and WCDMA technologies equally, or scan for WCDMA technologies a greater number of times than it may scan for GSM technologies, or vice versa.

This weighting logic, and in fact other logic described herein, may also be dynamically controlled by the mobile device (or alternatively an external entity, such as a wireless network management entity). For example, data relating to historical statistics on successful connections for the same and/or similar phones may be used as a basis for adjusting the weighting, such as were a moving average is employed. The logic may also adjust the weighting based on device capabilities; e.g., where one air interface is disabled or otherwise identified as having a low likelihood of success connecting (e.g., due to poor coverage of that technology within the geographic area where the user is located, such location being determined by the GPS receiver on the device, association with a given base station or wireless access point, etc.), that particular interface or technology can be de-emphasized or even eliminated from the scan/search routine.

In another variant of the disclosure, the mobile device is configured to connect (using whatever air interface that is then available to it, such as WLAN) to a network entity which feeds the current prevailing optimized search logic to the device so as to increase its chances of successful connection with minimal power expenditure.

Once an operable network has been found, the mobile device associates with the discovered network.

Apparatus—

Figure 5:
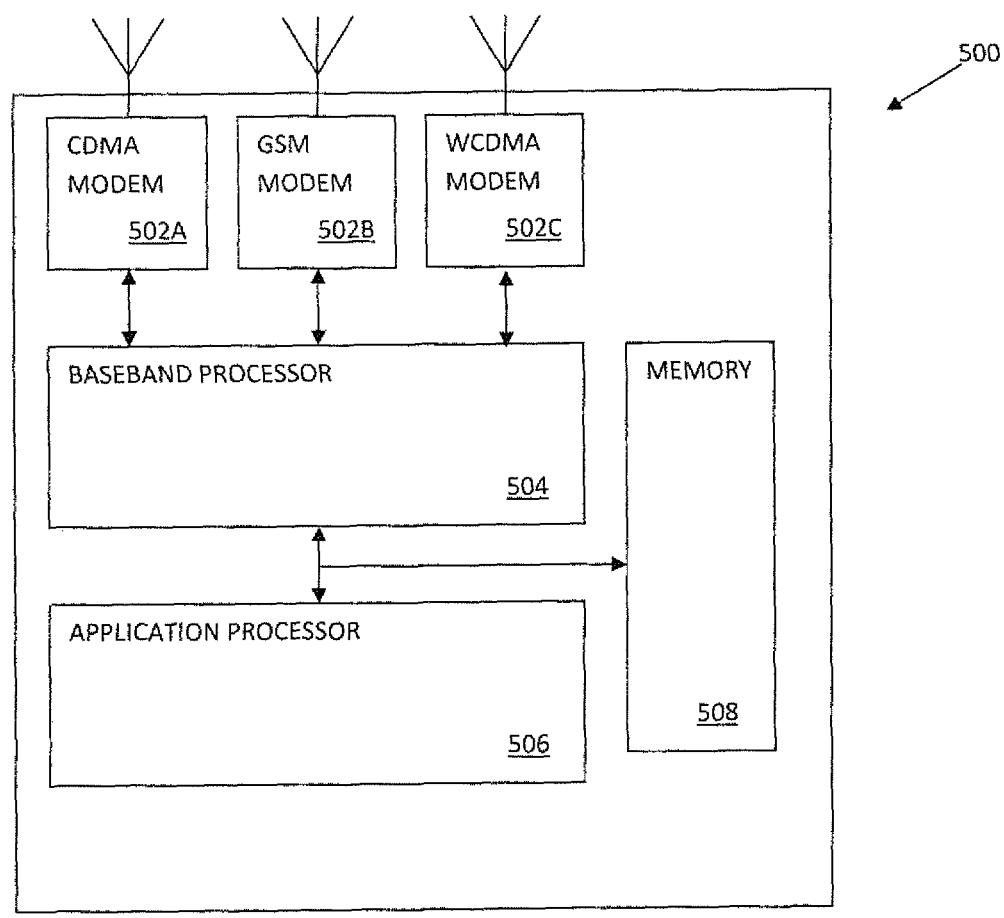
FIG. 5 is a graphical representation of one exemplary client device, useful in conjunction with various features of the present disclosure.

Referring now to FIG. 5, one exemplary client device 500 adapted to dynamically configure search operations in a multi-mode device is illustrated. As used herein, the term "client device" includes, but is not limited to cellular telephones, smart phones (such as for example an iPhone™), wireless-enabled tablet devices (such as for example an iPad™), or any combinations of the foregoing. While one specific device configuration and layout is shown and discussed herein, it is recognized that many other configurations may be readily implemented by one of ordinary skill given the present disclosure, the apparatus 500 of FIG. 5 being merely illustrative of the broader principles of the disclosure.

The apparatus 500 of FIG. 5 includes one or more modems 502, a baseband processor 504, an applications processor 506 and a computer readable memory subsystem 508.

The baseband processing subsystem 504 includes one or more of central processing units (CPU) or digital processors, such as a microprocessor, digital signal processor, field-programmable gate array, RISC core, or plurality of processing components mounted on one or more substrates. The baseband processing subsystem is coupled to computer readable memory 508, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The baseband processing subsystem 504 is adapted to receive one or more data streams from the one or more modems 502. As shown, the apparatus 500 includes (3) three modems: (i) a CDMA2000 modem 502A, (ii) a GSM modem 502B, and (iii) WCDMA modem 502C. Alternate embodiments may have distinct baseband processing systems corresponding to each modem (e.g., a CDMA2000 baseband, a GSM baseband, and a WCDMA baseband). Moreover, it is further appreciated that multi-mode devices are highly diverse; dual-mode, tri-mode, and quad-mode devices of various configurations are widely available. In fact, the various aspects of the disclosure are useful in and readily adapted to any multi-mode combination of one or more of the following: General Radio Packet Service (GPRS), Enhanced Data Rates for GSM Evolution (EDGE), Long Term Evolution (LTE), LTE-Advanced (LTE-A), Interim Standard 95 (IS-95), Interim Standard 2000 (IS-2000, also referred to as CDMA2000), CDMA 1XEV-DO, Time Division Single Carrier CDMA (TD-SCDMA), Time Division LTE (TD LTE), etc.

The application processing subsystem 506 includes one or more of central processing units (CPU) or digital processors, such as a microprocessor, digital signal processor, field-programmable gate array, RISC core, or plurality of processing components mounted on one or more substrates. The application processing subsystem is coupled to computer readable memory 508.

The application processing subsystem 506 is adapted to control overall operation of the device including, for example: multimedia processing, operating system controls, program management, baseband processor configuration and control, etc.

In one exemplary embodiment, the memory subsystem additionally comprises instructions which when executed by the application processor, dynamically adjusts the search delay and/or search frequency for each of the various modems. In alternate embodiments, the search delay and/or search frequency for each of the various modems is handled within the baseband processor. Other logical functions (such as e.g., implementation of the aforementioned dynamic weighting scheme) are also performed by logic within the memory subsystem in the exemplary embodiment.

Myriad other schemes for client-based capabilities management for dynamically configuring search operations in a multi-mode device will be recognized by those of ordinary skill given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles of the disclosure. The scope of the disclosure should be determined with reference to the claims.

What is claimed is:

1. A multi-network enabled wireless mobile device configured to search for a suitable network connection among multiple networks, the wireless mobile device comprising:
   a plurality of wireless interfaces; and
   logic in data communication with the plurality of wireless interfaces, the logic configured to cause the wireless mobile device to:
     identify information relating to a previously active network connection;
     determine a first search behavior based on the previously active network connection, the first search behavior comprising a single-network search mode for a first time duration;
     execute the first search behavior;
     when the first search behavior successfully executes, connect to the suitable network connection upon an expiration of the first time duration; and
     when the first search behavior does not successfully execute:
       determine a second search behavior comprising a multi-network search mode for a second time duration, and
       execute the second search behavior,
     wherein the first search behavior comprises dynamic configuration of search parameters based on data associated with the previously active network connection.

2. The wireless mobile device of claim 1, wherein the previously active network connection is selected from the group consisting of: (i) a last network connection established by the wireless mobile device and (ii) a last network connection established by the wireless mobile device for a prescribed period of time.

3. The wireless mobile device of claim 1, wherein the previously active network connection is selected from the group consisting of: (i) a last network connection established by the wireless mobile device and used to transfer an amount of data in excess of a minimum data transfer size and (ii) a last network connection established by the wireless mobile device and characterized by a receive signal strength in excess of a minimum signal strength parameter.

4. The wireless mobile device of claim 1, wherein the previously active network connection comprises a network connection established by the wireless mobile device within a time period before information identification and selected by the wireless mobile device from a plurality network connections based on a parameter related to one or more of: (i) a frequency of occurrence or (ii) a session duration associated with occurrence of the network connection within the time period.

5. The wireless mobile device of claim 1, wherein:
   the wireless mobile device is capable of operating in at least a home network and one or more roaming networks, each of the one or more roaming networks having a roaming geographic coordinate associated therewith;
   the wireless mobile device determines the first search behavior or the second search behavior by at least determining a present geographic coordinate of the wireless mobile device; and
   the first search behavior or the second search behavior comprises a search for at least one of the one or more roaming networks based on the present geographic coordinate matching the roaming geographic coordinate of the at least one of the one or more roaming networks.

6. The wireless mobile device of claim 5, wherein the wireless mobile device selects the at least one of the one or more roaming networks based on a deployment density of the at least one of the one or more roaming networks at the present geographic coordinate exceeding a deployment density of at least one other roaming network of the one or more roaming networks at the present geographic coordinate.

7. The wireless mobile device of claim 5, wherein:
   the home network and the one or more roaming networks each comprise: (i) a CDMA2000 network, (ii) a GSM network, or (iii) a WCDMA network; and
   the expiration of the first time duration is based on a counter.

8. A method for a wireless mobile device to search for a network connection in multiple networks comprising at least a first network and a second network, the method comprising:
   by the wireless mobile device:
     identifying information relating to one or more device conditions;
     determining a first search behavior based on the identified information, the first search behavior comprising a single-network search mode for a first time duration;
     executing the first search behavior;
     when the first search behavior successfully executes, connecting to the first network upon an expiration of the first time duration; and
     when the first search behavior does not successfully execute:
       determining a second search behavior comprising a multi-network search mode for a second time duration, and
       executing the second search behavior,
   wherein the one or more device conditions comprises at least a previously active network connection, and
   wherein the first search behavior comprises dynamic configuration of search parameters based on data associated with the one or more device conditions.

9. The method of claim 8, wherein:
   the first time duration is shorter than the second time duration.

10. The method of claim 8, wherein the one or more device conditions further comprise one or more of: (i) device power consumption in at least one of the first and second networks or (ii) a remaining battery life of the wireless mobile device.

11. The method of claim 8, wherein the one or more device conditions further comprise one or more of: (i) an outcome of a previous search behavior, (ii) a geographic location of the wireless mobile device, (iii) a preference setting associated with a user of the wireless mobile device or (iv) out-of-band information related to discovery of at least one of the first and second networks.

12. The method of claim 8, wherein the first search behavior is based at least in part on a determination that a probability of locating the first network within the first time duration is greater than a probability of locating the second network within the first time duration.

13. A non-transitory computer readable medium storing instructions that, when executed by a processor in a wireless mobile device, cause the wireless mobile device to:
    enable a multi-network connection capability;
    identify information relating to a previously active network connection;
    determine a first search behavior based on the previously active network connection, the first search behavior comprising a single-network search mode for a first time duration;
    execute the first search behavior;
    when the first search behavior successfully executes, connect to a suitable network connection upon expiration of the first time duration; and
    when the first search behavior does not successfully execute:
        determine a second search behavior comprising a multi-network search mode for a second time duration, and execute the second search behavior,
    wherein the first search behavior comprises dynamic configuration of search parameters based on data associated with the previously active network connection.

14. The non-transitory computer readable medium of claim 13, wherein the previously active network connection is selected from the group consisting of: (i) a last network connection established by the wireless mobile device and (ii) a last network connection established by the wireless mobile device for a prescribed period of time.

15. The non-transitory computer readable medium of claim 13, wherein the previously active network connection is selected from the group consisting of: (i) a last network connection established by the wireless mobile device and used to transfer an amount of data in excess of a minimum data transfer size and (ii) a last network connection established by the wireless mobile device and characterized by a receive signal strength in excess of a minimum signal strength parameter.

16. The non-transitory computer readable medium of claim 13, wherein the previously active network connection comprises a network connection established by the wireless mobile device within a time period before information identification and selected by the wireless mobile device from a plurality network connections based on a parameter related to one or more of: (i) a frequency of occurrence or (ii) a session duration associated with occurrence of the network connection within the time period.

17. The non-transitory computer readable medium of claim 13, wherein:
    the wireless mobile device is capable of operating in at least a home network and one or more roaming networks, each of the one or more roaming networks having a roaming geographic coordinate associated therewith;
    the wireless mobile device determines the first search behavior or the second search behavior by at least determining a present geographic coordinate of the wireless mobile device; and
    the first search behavior or the second search behavior comprises a search for at least one of the one or more roaming networks based on the present geographic coordinate matching the roaming geographic coordinate of the at least one of the one or more roaming networks.

* * * * *